Patented May 13, 1952

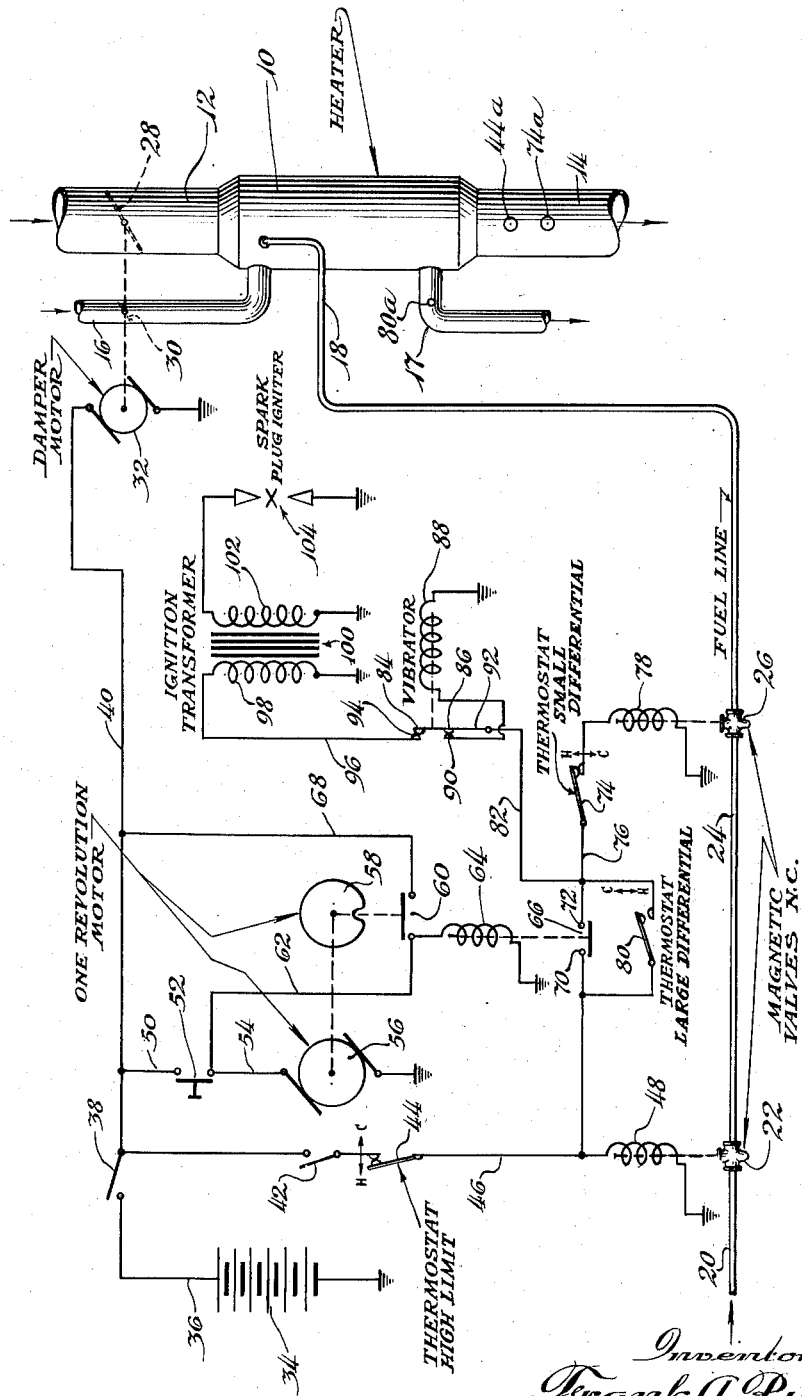

2,596,290

UNITED STATES PATENT OFFICE 2,596,290

HEATER COMBUSTION CONTROL SYSTEM

Frank A. Ryder and Donald A. Potter, Indianapolis, Ind., assignors to Stewart-Warner Corporation, Chicago, Ill., a corporation of Virginia Application May 19, 1949, Serial No. 94,095

3 Claims. (Cl. 236—11)

The present invention relates to aircraft heater combustion control systems primarily, although certain aspects of the invention may be applied to heaters of more general application.

Recent trends in aircraft heater design indicate the desirability of heaters which burn the aircraft engine fuel, usually gasoline, in a sealed chamber which comprises the combustion chamber and the heat exchanger of the heater. This sealed chamber has inlet and outlet openings which terminate outside the aircraft. Ventilating air to be heated is passed in contact with the heat exchanger on its way to the space to be heated. Usually, air both for combustion and for ventilation is obtained from rams or scoops which frequently comprise openings in the leading edge of the aircraft wing. Although heaters of this general type are largely used for aircraft cabin heating they are finding increased usefulness in heating the wings and tail surfaces of aircraft to prevent the formation of ice. Heaters for this purpose must have enormous heating capacity by ordinary standards even though their size and weight must be kept to a minimum. Most important of all, they must be inherently safe and reliable. Reliability is especially important when the heaters are used for anti-icing purposes. A heater of this general character is shown in application Serial No. 8,106 filed by Gerald Jacobs February 13, 1948, now Patent No. 2,531,939, dated November 28, 1950, for "Intermittent Combustion Spark Ignition Aircraft Heater."

In order to achieve low weight, great safety, and a high degree of reliability it is advisable that the heater control system be comprised largely of components whose expected life can be quite well predicted. It is an inherent advantage, therefore, to use equipment for control purposes which is as little complicated as possible, considering the objective to be obtained, and, in addition, whereever possible it is advantageous to use elements in the control system which have been widely manufactured for other purposes, since the past usage of such elements in other applications has in most instances resulted in the design being standardized upon a basis which insures predictable performance.

A heater of this type should be so arranged that it may be turned on and off easily at a remote point and should be automatically controlled so that if it does not start within a reasonable time or if at any time it stops operation for an excessive period or if the heater overheats for any reason the fuel to the heater will be turned off. This is especially important when heaters are used in anti-icing applications since a single such heater may have an output of the order of 750,000 B. t. u. per hour, or of the order of ten times as much as an ordinary house furnace and one aircraft may have several of them operating simultaneously at remote and inaccessible locations. The rate of flow of fuel to such heaters, therefore, is high. In addition to the desirable features just recited which have to do with safety of operation of the heater it is necessary that the heating system automatically supply air at the proper temperature to accomplish the desired purpose. To do this may require modulating the heat output of the heater all the way from full output down to an output so low that efficient continuous operation of the heater is impractical either because combustion may fail or because efficiency may be excessively low.

In view of the above it is the principal object of our invention to provide a control system for a spark ignited liquid fuel burning combustion heater which accomplishes all of the above set out objectives in an extremely simple manner and with equipment which is known to be reliable in operation.

Still another object of our invention is to provide a heater control system which obtains great simplicity by depending for its operation to a considerable extent upon the inherent time lag characteristics of certain control elements and which co-ordinates these time lag characteristics with a timing mechanism matched to their particular characteristics.

Other objects and advantages will become apparent from the following description of a preferred embodiment of our invention which is illustrated in the accompanying drawing.

The single figure in the drawings is a diagrammatic representation of an aircraft heater and a control system thereof which embodies the teachings of the present invention.

Referring to the drawing, an aircraft heater is indicated generally by the numeral 10. This heater receives ventilating air to be heated by way of a duct 12 and delivers the heated air through a duct 14 connected at the opposite end of the heater. Air for combustion is supplied to the heater through a conduit 16 while the heater exhaust is passed overboard through an exhaust pipe 17. In normal use the duct 12 will be connected to a scoop or ram located in the leading edge of the wing or at some other position on the outside of the aircraft. The air supplied to the combustion air conduit 16 preferably will be obtained from a separate and smaller scoop although if desired the same scoop may supply air to both the conduit 16 and the duct 12.

Fuel is supplied to the heater through a line 18 which usually leads from the engine fuel supply system by way of a pipe 20 and thence through a safety shut-off valve 22. This valve in turn is connected by a pipe 24 to a second shut-off valve 26 which in turn connects with the referred to line 18. Both valves 22 and 26 are electromagnetically operated and are so arranged that when de-energized the valves will be closed but will permit fuel flow therethrough when electrically energized by means of the circuit to be described presently.

Flow of ventilating air through the supply duct 12 is controlled by a damper therein indicated by the numeral 28. Similarly, combustion air flow through the conduit 16 is controlled by a damper 30. Both these dampers are shown in closed position and may be considered as mounted upon a single shaft which is connected to be rotated by a damper motor 32. The characteristics of this motor are such that when the motor is de-energized the dampers 30 and 28 will be in the closed position as shown. When the motor 32 is energized it operates so as to swing both these dampers to the open position and to maintain them in this position so long as energized. When the motor is de-energized the dampers 28 and 30 return to the closed position. Since such motors have wide application in controlling the airflow through ducts in aircraft systems generally no detailed description of this motor need be given since it is a well understood control component familiar to those skilled in the art.

The control circuit shown receives energy from the aircraft battery 34, one side of which is grounded while the other side is connected by a lead 36 to a master switch 38. The other side of the master switch is connected to a main lead 40 which connects in turn to the damper motor 32. Thus, closing the master switch 38 causes energization of damper motor 32, thereby opening the dampers 28 and 30 so as to permit the passage of ventilating air through the system. This conditions the system for starting or if desired, closure of the switch 38 alone permits the flow of ventilating air for general ventilating purposes in an unheated condition.

The line 40 is also connected through a single pole, single throw heater switch 42 to a thermostatic overheat switch 44 which perferably is of the manually reset type. This overheat switch in turn is connected by a line 46 to the magnetic coil 48 of the magnetic fuel valve 22. The overheat thermostatic switch 44 is normally closed but opens to shut off the heater whenever the temperature of the ventilating air leaving the heater becomes excessive. Its mounting position relative to the heater is indicated by a small circle on the hot air duct 14 at 44a.

Line 40 is also connected by lead 50 to one of the contacts of a momentary contact push button 52, the other contact of which is connected by a lead 54 to a one revolution motor 56. The shaft of this motor is geared down so as to have a speed of approximately one revolution per minute and this low speed shaft is connected to drive a cam 58 which operates a switch 60 once per revolution. One terminal of this switch 60 is connected by a lead 62 to the motor side of the push button switch 52 and also to the coil 64 of a normally open relay 66. The other terminal of the switch 60 is connected by a line 68 to the main lead 40.

Although various types of motors may be used in the application indicated at 56 we prefer to use what is commonly known as a reed sychronized motor. These motors are small and are operated on direct current and have a constant speed which is determined by the frequency of a vibrating reed. Of course, any other motor having comparatively constant speed characteristics may be used in place of a reed synchronized motor if desired. The cam 58 is so shaped that when it is in the position shown the switch 60 is open. As soon as the motor 56 has started, however, and has operated for a few seconds the cam 58 will rotate to a position where the switch 60 is closed and the cam will maintain the switch in closed position until it has rotated 360 degrees whereupon the switch 60 will reopen. The portion of the circuit just described, therefore, is such that closure of the switch 60 by the motor 56 and cam 58 energizes the coil 64 for one complete revolution of the motor 56, or in other words, for approximately one minute. As soon as the minute has passed the switch 60 reopens, thereby de-energizing the coil 64 and permitting the relay 66 to fall open (the relay being of the normally open, single pole, single throw type). Push button 52 when momentarily depressed energizes the motor 56 directly from the line 40 and places it in operation and simultaneously by way of the line 62 energizes the relay coil 64. A few seconds thereafter the holding circuit by way of the line 68 and switch 60 will have been closed so that release of the push button 52 does not de-energize either the motor 56 or the coil 64, both of these elements remaining energized for approximately one minute.

One of the contacts 70 of the normally open relay switch 66 is connected to the lead 46 so that this contact is energized simultaneously with the energization of the coil 48 of valve 22. The other contact 72 of relay switch 66 is connected to a normally closed thermostatic cycling switch 74 by a lead 76. This thermostatic cycling switch is of the normally closed type and is located in the heater ventilating air outlet duct 14 at a point indicated by the numeral 74a. This switch is of the quick response type. That is, it follows fluctuations in the temperature of the ventilating air quite rapidly and has a comparatively small differential (a matter of two or three degrees or so) between its on and off positions. The thermostatic switch in turn is connected to the magnetic coil 78 of the electromagnetic valve 26 which for convenience will be known as the cycling valve.

A normally open flame detector thermostatic switch indicated by the numeral 80, is wired in parallel with the relay switch 66. This normally open flame detector switch is conveniently installed in the exhaust pipe 17 at the point indicated by the numeral 80a and has characteristics unlike the thermostatic cycling switch 74. It is arranged so that it does not close until a temperature of, for instance, 700 degrees F. or so is reached, but once closed it does not reopen until the temperature has dropped to, for instance, 200 degrees F. or so. This operation may be accomplished by using a snap action switch operated by an expanding and contracting element. Such switches are well known. A typical example is shown in application Serial No. 684,350, filed July 17, 1946, by Arthur R. Collins, Frank A. Ryder, and Ross D. Randall, now Patent No. 2,581,942, dated January 8, 1952. In that example a simple snap action switch is operated by the differential expansion of a fused quartz rod and a stainless steel tube. The on-off temperature differential of the switch may be set as desired by properly proportioning the length of the differentially expanding elements with the switch operating characteristics.

A lead 82 is connected to the line 76 and to a pair of contacts 84 and 86 mounted upon a vibratory reed-like element which moves under the influence of an electromagnetic coil 88. This coil is connected to a stationary contact 90 which engages contact 86 when the vibratory element indicated generally by the numeral 92 is in its free position. The other movable contact 84 is associated with a stationary contact 94 which is in engagement therewith when the vibratory element 92 is in its free position and which is connected by a lead 96 to one end of the primary 98 of a step-up ignition transformer 100. The other end of the primary is grounded while the secondary 102 is connected to a spark plug 104 disposed with its sparking end within the burner of the heater 10.

When the line 82 is energized, therefore, current flows through the contacts 86 and 90 to the coil 88, thereby energizing this coil and moving the vibratory element 92 so as to separate contacts 86 and 90. The coil 88 is therefore de-energized and permits contact 86 to be brought once more against contact 90, thereby repeating the cycle. Self-contained vibrators of this type are well known and information is available as to their performance and life characteristics. Each time the cycle is passed through, the contacts 84 and 94 will be made and broken, thereby energizing the primary 98 of the transformer intermittently. This intermittent direct current to the primary 98 is stepped up in the secondary 102 and energizes the spark plug 104 at a voltage which insures continuous ignition so long as the lead 82 is energized.

The control system as a unit operates in the following manner. The heater is conditioned for operation by closing the master switch 38. This energizes the damper motor 32 and opens the dampers 28 and 30, thereby supplying combustion air and ventilating air to the heater 10. Subsequently, when the heater switch 42 is closed, the magnetic valve 22 will be energized and opened. This valve normally will be located at a remote point in the fuel system so as to be comparatively close either to a special pump which supplies fuel to the heater or to the aircraft engine fuel line. If a separate heater fuel pump is used, it may replace valve 22 or be wired in parallel with coil 48. Opening of the valve 22, however, does not start the heater but simply supplies fuel to the branch line leading to the heater.

The heater is now started by depressing the push button 52 and holding it for a matter of three seconds or so, thereby energizing the one revolution motor 56 and relay coil 64. As previously explained, after the one revolution motor 56 has been energized by the push button 52 for a matter of three seconds or so the holding circuit through the lead 68 comes into operation due to the closure of the switch 60 by the cam 58.

As soon as the relay 64 is energized the contacts 70 and 72 are closed, thereby energizing the ignition system lead 82 and the cycling switch lead 76. Sparking at the spark plug 104 therefore immediately takes place and since the thermostat 74 is cold and in the closed position the coil 78 will be energized, thereby opening the cycling valve 26. The heater now is receiving ventilating air, combustion air, and fuel, and sparking is taking place at the igniter plug 104. As soon as fuel reaches the nozzle in the heater, therefore, ignition takes place almost instantaneously.

Because heaters of the type used in aircraft applications have comparatively low mass in their heat exchangers in proportion to the heat output of the heater, the temperature of the ventilating air will rise rapidly as will the temperature of the exhaust flowing through the pipe 17. Because the thermostatic switch 80 does not close until a temperature of 700 degrees F. or so is reached, there will be a considerable time interval during which it remains open during the starting cycle. It does, however, provided the heater is functioning properly, close within less than a minute and shunt the contacts 70 and 72 before the cam 58 has completed its single revolution which normally takes place in about one minute. As soon as the cam 58 completes its revolution the motor 56 is de-energized as is the relay coil 64, thereby permitting the contacts 70 and 72 to be separated. This, however, does not affect operation of the heater if the thermostatic flame detector 80 has closed in the meantime. On the other hand, if the heater does not start properly, the thermostat 80 will not have reached a temperature of 700 degrees meanwhile, with the result that as soon as the cam 58 completes its single revolution so as to open the relay contacts 66 the cycling valve coil 78 will be de-energized, thereby turning off the fuel to the heater. Also, the ignition system connected to the line 82 will be de-energized. The heater therefore is placed out of operation unless it starts promptly and operates long enough so that its exhaust temperature rises to 700 degrees or so within less than one minute.

If the heater functions normally the flame detector switch 80 remains closed and fuel continues to be supplied to the heater until the temperature of the cycling switch 74 rises to the set level. When this happens, the switch 74 opens, thereby de-energizing the coil 78 and causing the cycling valve 26 to close. This shuts off the flow of fuel to the heater, thereby extinguishing combustion. The ignition system, however, continues to function so that if the thermostat 74 cools sufficiently to reclose before the flame detector switch 80 has cooled to 200 degrees F. (its opening point) the heater will be substantially instantaneously restarted by reopening of the valve 26.

Since the cycling characteristics of the cycling switch 74 are such that a variation in its temperature of a matter of a few degrees one way or the other will result in its opening or closing, the heating system will continue to operate indefinitely, cycling the combustion on and off without the temperature of the flame detector switch ever dropping below 200 degrees. If, however, the heater cycles to the off position and then does not relight, or if for any other reason combustion fails or the overheat switch 44 operates, the temperature of the flame detector switch 80 will presently drop below 200 degrees, thereby causing the switch 80 to open with the result that the ignition system and the lead 76 are permanently de-energized until the push button 52 is pressed to start the heater operating all over again.

Because of the low mass of the heat exchanger, considering the heat output achieved therefrom, the temperature of the metal of the heat exchanger and therefore the temperature of the ventilating air will quite promptly follow the combustion conditions in the burner. In other words, if combustion is extinguished, the temperature of the ventilating air will drop enough quite promptly to reclose switch 74 since the cycling thermostat is arranged to open or close upon a small differential. The rapid cyling of the thermostat 74 also maintains the temperature of the ventilating air substantially constant. For instance, it may be desired to maintain the temperature of the ventilating air at approximately 125 degrees. As the temperature of the ventilating air rises to 125 degrees the thermostat opens. The temperature of the ventilating air will, of course, overshoot slightly beyond this point before starting to drop. As it drops to 125 degrees or so the cycling switch will again close and although the burner lights almost instantly the temperature of the ventilating air will overshoot slightly below 125 degrees before beginning to rise again. The off cycles, however, are of such short duration that the temperature of the air remains substantially constant for all practical purposes and the flame detector switch which has a large differential will never open unless the burner has been off for a period longer than would be normal even though a relatively low temperature of the ventilating air happened to be required.

It will be seen from the above that through the use of a flame detector with a wide differential and slow response in conjunction with a cycling switch of rapid response used together with the one minute holding circuit provided by the one revolution motor and a heat exchanger of low mass and high output, it is possible through the use of a comparatively simple circuit and well tested circuit components to provide all of the control features required by an aircraft heating system even though the temperature of the ventilating air is required to be maintained at a comparatively constant level.

Although we have described and illustrated one embodiment of our invention it will be appreciated that variations may be made in this specific showing without departing from the scope of the invention. The invention therefore should be measured by the following claims.

We claim:

1. A heating system comprising a fuel burning air heater having ventilating air and combustion air connections, damper means for controlling the flow through said connections, electric energy responsive means to open said dampers when energized and to close said dampers when deenergized, an electric circuit including an on-off switch for energizing said electric energy responsive means, electric energy responsive means to supply fuel to the heater when energized, a second electric circuit for energizing said fuel supplying means, said second circuit being connected to receive energy through said first circuit so that said second circuit is deenergized unless said first circuit is energized, temperature sensitive switch means in said second circuit for interrupting the second circuit for an interval until the temperature of said heater has reached a predetermined level indicating proper operation of the heater and for completing said second circuit when said predetermined level is reached, other switching means connected in parallel with the last said switch means, and means for closing said other switching means for a single timed interval longer than the first said interval at the start of heater operation, and a second temperature sensitive switching means in said second circuit for completing or interrupting said second circuit as the temperature of the heated air drops below or rises above a desired level, the temperature differential of operation of said first temperature sensitive switch means being several times as large as the temperature differential of said second temperature sensitive switching means.

2. A heating system comprising a fuel burning air heater, electric energy responsive means to supply fuel to the heater when energized, an electric circuit for energizing said fuel supplying means, temperature sensitive switch means in said circuit for interrupting the circuit for an interval until the temperature of said heater has reached a predetermined level indicating proper operation of the heater and for completing said circuit when said predetermined level is reached, other switching means connected in parallel with said switch means, and means for closing said other switching means for a single timed interval longer than the first said interval at the start of heater operation, and a second temperature sensitive switching means in said circuit for completing or interrupting said circuit as the temperature of the heated air drops below or rises above a desired level, the temperature differential of operation of said first temperature sensitive switch means being several times as large as the temperature differential of said second temperature sensitive switching means.

3. A heating system comprising a fuel burning air heater having a ventilating air connection, means for controlling the flow through said connection, electric energy responsive means to operate the controlling means to open said connection when energized and to close said connection when deenergized, an electric circuit including an on-off switch for energizing said electric energy responsive means, electric energy responsive means to supply fuel to the heater when energized, a second electric circuit for energizing said fuel supplying means, said second circuit being connected to receive energy through said first circuit so that said second circuit is deenergized unless said first circuit is energized, temperature sensitive switch means in said second circuit for interrupting the second circuit for an interval until the temperature of said heater has reached a predetermined level indicating proper operation of the heater and for completing said second circuit when said predetermined level is reached, other switching means connected in parallel with the last said switch means, and means for closing said other switching means for a single timed interval longer than the first said interval at the start of heater operation, and a second temperature sensitive switching means in said second circuit for completing or interrupting said second circuit as the temperature of the heated air drops below or rises above a desired level, said first temperature sensitive switch having an operating differential several times as large as said second temperature sensitive switch.

FRANK A. RYDER.
DONALD A. POTTER.

REFERENCES CITED

The following references are of record in the file of this patent:

UNITED STATES PATENTS

| Number | Name | Date |
|---|---|---|
| 1,270,877 | Schulz | July 2, 1918 |
| 2,160,592 | King | May 30, 1939 |
| 2,230,446 | Baker | Feb. 4, 1941 |
| 2,428,867 | DeLancey | Oct. 14, 1947 |
| 2,451,760 | McCollum | Oct. 19, 1948 |
| 2,484,602 | Aubert | Oct. 11, 1949 |